United States Patent
Guillez et al.

(12)
(10) Patent No.: US 6,682,149 B1
(45) Date of Patent: Jan. 27, 2004

(54) ROOF THAT CAN BE RETRACTED INTO THE TRUNK OF A VEHICLE

(75) Inventors: Jean-Marc Guillez, Cirieres (FR); Paul Queveau, Montravers (FR); Gérard Queveau, Le Pin (FR)

(73) Assignee: France Design, Lieu-Dit la Boujaliere (FR)

( * ) Notice: Subject to any disclaimer, the term of this patent is extended or adjusted under 35 U.S.C. 154(b) by 0 days.

(21) Appl. No.: 10/149,030
(22) PCT Filed: Nov. 15, 2000
(86) PCT No.: PCT/FR00/03175
§ 371 (c)(1), (2), (4) Date: Jun. 3, 2002
(87) PCT Pub. No.: WO01/45976
PCT Pub. Date: Jun. 28, 2001

(30) Foreign Application Priority Data

Dec. 20, 1999 (FR) .............................................. 99 16083

(51) Int. Cl.[7] .................................................. B60J 7/20
(52) U.S. Cl. .................................... 298/108; 296/107.08
(58) Field of Search ............................ 296/107.08, 108, 296/136

(56) References Cited

U.S. PATENT DOCUMENTS

| | | | |
|---|---|---|---|
| 5,921,608 A | | 7/1999 | Schmitt et al. ......... 296/107.08 |
| 5,967,593 A | * | 10/1999 | Schuler et al. ...... 296/107.08 X |
| 6,030,023 A | * | 2/2000 | Guillez ........................ 296/136 |
| 6,145,915 A | * | 11/2000 | Queveau et al. ....... 296/107.08 |

FOREIGN PATENT DOCUMENTS

| | | | | |
|---|---|---|---|---|
| DE | 197 14 105 A1 | 10/1998 | ............... | B60J/7/08 |
| FR | 2 759 729 | 2/1997 | ........... | E05F/17/00 |

* cited by examiner

*Primary Examiner*—Dennis H. Pedder
(74) *Attorney, Agent, or Firm*—Nawrocki, Rooney & Sivertson, P.A.

(57) ABSTRACT

The retractable roof comprises a front element connected in an articulated fashion to a rear element, these two elements being able to move between a position in which they cover the passenger compartment of the vehicle and a position in which they are folded in the trunk. Beyond each lateral edge (8a) of the rear surface (8) there is provided an obturator (9) able to pivot on an axis parallel to the longitudinal axis of the vehicle between a position in which each obturator (9) is situated in line with the rear surface (8) and a position in which each obturator (9) frees a passage to the trunk.

8 Claims, 6 Drawing Sheets

ROOF THAT CAN BE RETRACTED INTO THE TRUNK OF A VEHICLE

The present invention relates to a roof that can be retracted into the trunk of a vehicle in order to convert it into a cabriolet.

Vehicles are known equipped with a roof that can be retracted into the trunk of a vehicle, comprising a front element connected in an articulated fashion to a rear element, these two elements being able to move between a position in which they cover the passenger compartment of the vehicle and a position in which they are folded in the trunk.

Such a retractable roof is described for example in the French patent 97 02 024 in the name of the Applicant.

The vehicle described in the aforementioned patent comprises, between the rear seat of its passenger compartment and the rear edge of the rear element, a rear surface which can tilt in order to release an opening opening out into the trunk to allow passage of the two roof elements.

However, this pivoting rear surface can under no circumstances release the lateral parts situated on each side of this rear surface to allow passage of the arms which control the movement of the two elements of the roof towards the trunk and conversely the movement thereof towards the position in which they cover the passenger compartment.

The aim of the present invention is to remedy the above drawback.

According to the invention, the retractable roof is characterised in that, beyond each lateral edge of the rear surface there is provided a cover, referred to hereafter as an obturator, able to pivot on an axis parallel to the longitudinal axis of the vehicle between a position in which each obturator is situated in line with the rear surface and a position in which each obturator releases a passage towards the trunk.

The openings thus released allow passage of the pivoting arms which control the movement of the roof elements towards the trunk and vice-versa.

According to a preferred invention, the retractable roof comprises means for simultaneously controlling the tilting of the rear surface on an axis perpendicular to the longitudinal axis of the vehicle and the tilting of each obturator on an axis parallel to the longitudinal axis of the vehicle.

Preferably the said means are arranged to control the tilting of the rear surface towards the inside and towards the front of the trunk and the tilting of the obturators towards the outside under the rear wings of the vehicle.

Other particularities and advantages of the invention will also emerge from the following description.

In the accompanying drawings, given by way of non-limitative examples:

Figure 1:
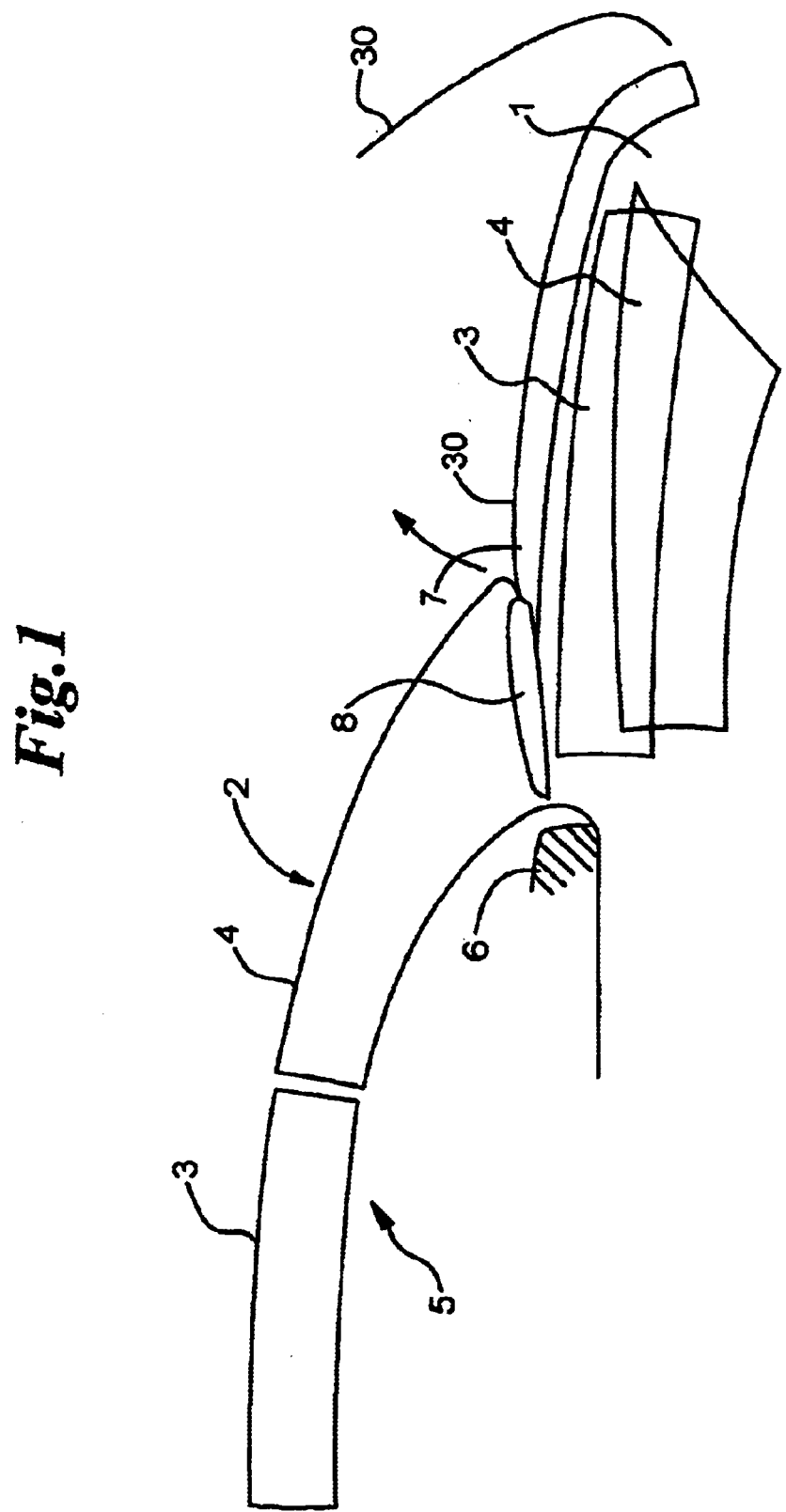
FIG. 1 is a schematic view in longitudinal section of a vehicle equipped with a roof that can be retracted into the trunk.
Figure 2:
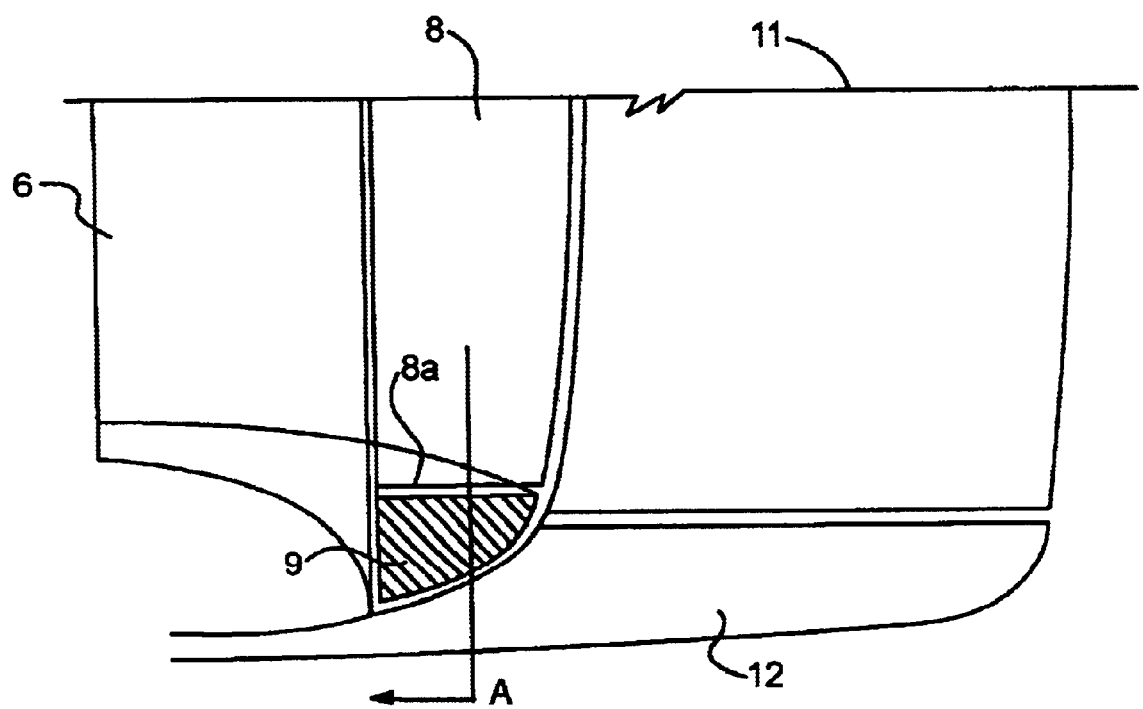
FIG. 2 is a half-view in plan and section of the rear part of the vehicle, showing the rear surface and a lateral obturator.

In the embodiment illustrated by FIG. 1, the roof that can be retracted in the trunk 1 of a vehicle 2 comprises a front rigid element 3 connected in an articulated fashion to a rear rigid element 4 which constitutes the rear window.

These two elements 3, 4 are able to move between a position in which they cover the passenger compartment 5 of the vehicle 2 and a position in which they are folded in the trunk 1.

In addition, the vehicle 2 comprises, under the rear window, between the rear seat 6 of its passenger compartment 5 and the rear edge 7 of the rear element 4, a rear surface 8 able to tilt and able to release an opening opening out in the trunk 1 to allow passage of the two roof elements 3, 4.

As shown by FIGS. 2, 3, 4 and 5, beyond each lateral edge 8a of the rear surface 8 there is provided an obturator 9 able to pivot on an axis 10 parallel to the longitudinal axis 11 of the vehicle, between a position (see FIG. 3) in which each obturator 9 is situated in line with the rear surface 8 and a position (see 9' in FIG. 3) in which each obturator 9 releases a passage to the trunk 1.

Preferably the retractable roof comprises means 40 for simultaneously controlling the tilting of the rear surface 8 on an axis 18 perpendicular to the longitudinal axis 11 of the vehicle 2 and the tilting of each obturator 9 on axis 10 parallel to the longitudinal axis 11 of the vehicle.

Figure 3:
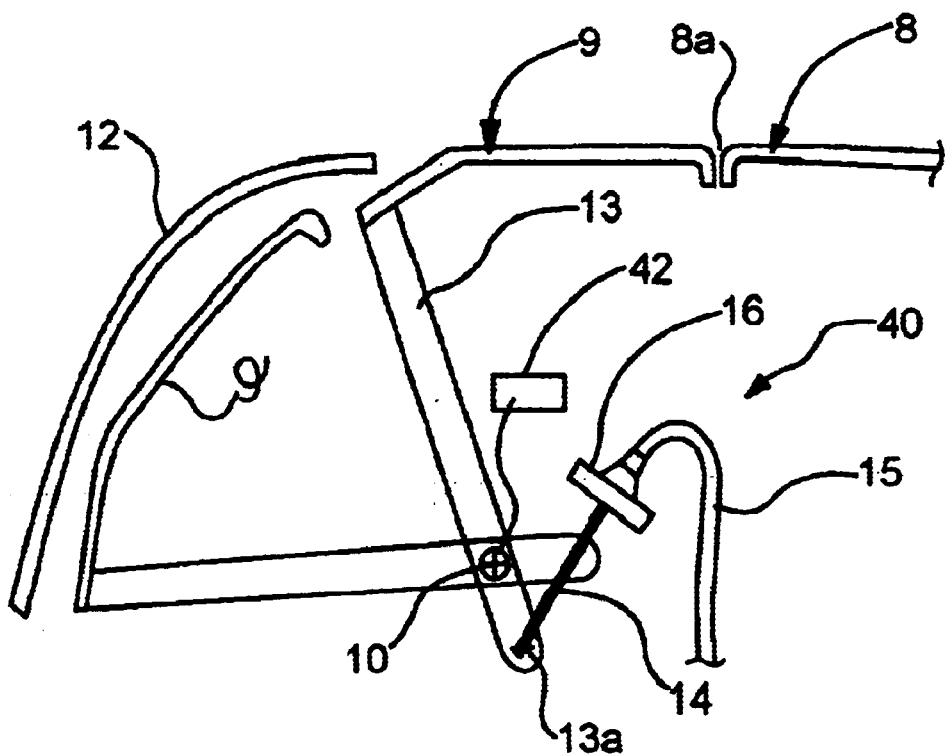
FIG. 3 is a view in section along the plane A in FIG. 2, showing a first version of the mechanism controlling the tilting of a lateral obturator.

The above means are arranged to control the tilting of the rear surface 8 towards the inside and towards the front of the trunk 1 and the tilting of the obturators 9 towards the outside under the rear wings 12 of the vehicle, as shown by FIG. 3.

In the example in FIG. 3, the tilting of each obturator 9 is controlled by an arm 13 mounted so as to pivot on an axis 10 parallel to the axis 11 of the vehicle and situated under the obturator 9 when the latter is in line with the rear surface 8.

In this example, the means 40 for controlling the pivoting of the arm 13 comprise a cable 14 connected to the end 13a of the arm 13 situated beyond its pivot axis 10 opposite the obturator 9. As a variant, the means for controlling the pivoting of the arm 13 can consist of an electric motor 42 in engagement on the pivot axis 10 of the arm 13 as is alternately represented or indicated in FIG. 3.

The cable 14 is engaged in a sheath 15 held on a fixed support 16.

Figure 4:
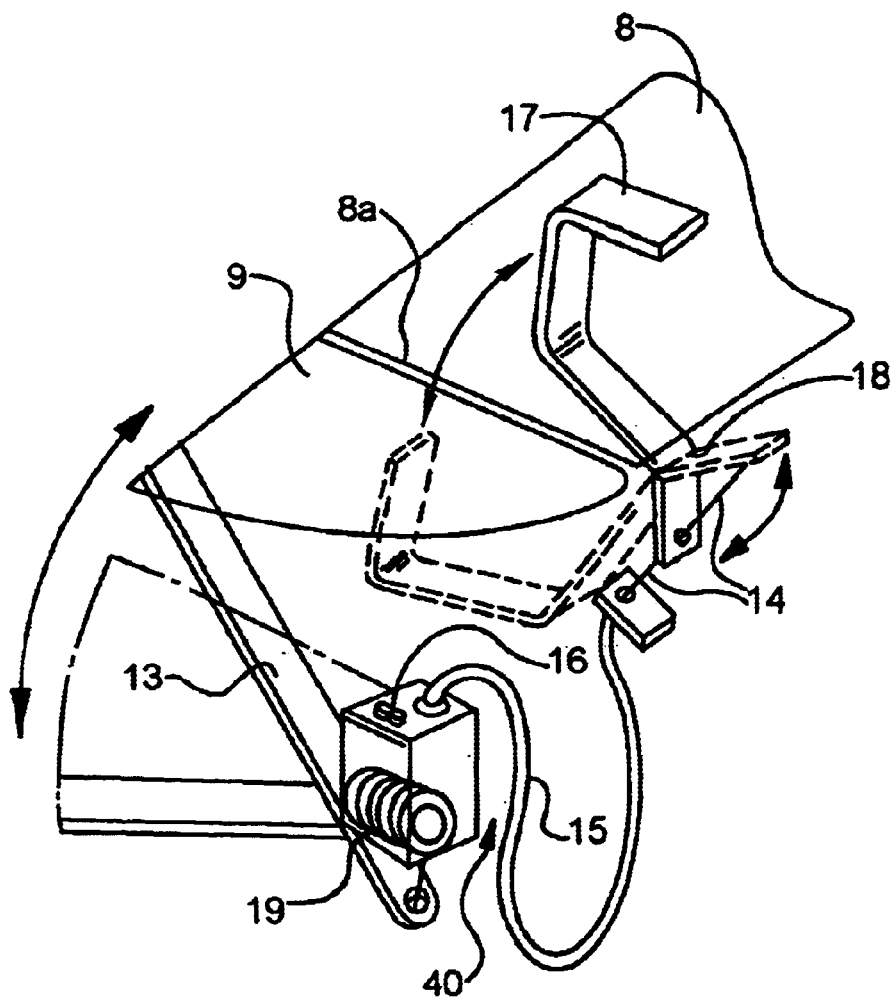
FIG. 4 is a partial view of the obturator, of the rear surface and of their control mechanism.

As shown by FIG. 4, the same cable 14 is connected to the end of an arm 17 which controls the tilting of the rear surface 8 about the axis 18 which is perpendicular to the axis of the vehicle.

In addition, a return spring 19 is provided for controlling the tilting of the rear surface 8 and/or of the obturators 9 from their open position to their closed position.

Figure 5:
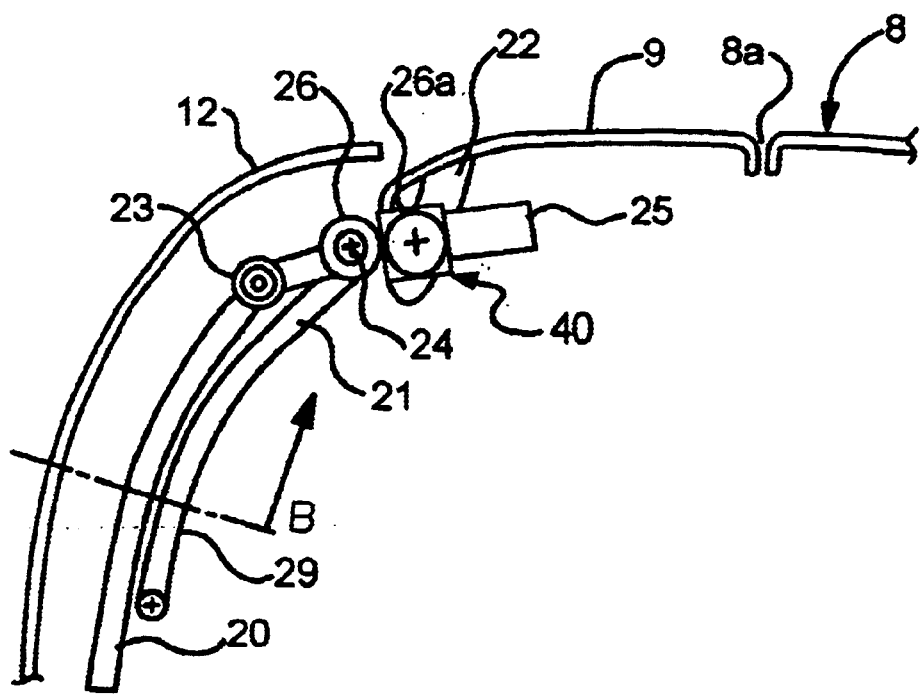
FIG. 5 is a view similar to FIG. 3, showing a second version of the mechanism controlling the tilting of a lateral obturator.

In the version depicted in FIG. 5, the means for controlling the tilting of each obturator 9 comprise two guides or runners 20, 21 extending under the rear wing 12 and close to the internal surface thereof.

The obturator 9 is carried by an arm 22 having two rollers 23, 24 engaged respectively in the two runners 20, 21.

The runners 20, 21 are adapted to guide the movement of the obturator 9 between a closed position and an open position in which the obturator 9 is situated close to the internal surface of the rear wing 12 of the vehicle.

The means for controlling the movement of the obturator 9 along the runners 20, 21 comprise an electric motor 25 fixed to the obturator 9.

The motor 25 drives a pinion 26 by means of a pinion 26a (or directly at the gearbox output).

Figure 6:
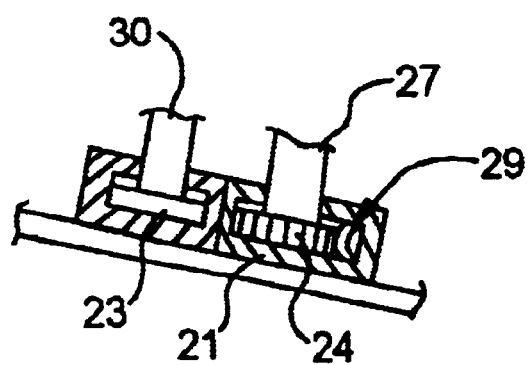
FIG. 6 is a view in section along the plane B in FIG. 5.

The pinion 26a is connected to a shaft 27 (see FIG. 6) sliding in the runner 21 and driving a pinion 24 meshing on a rack 29 extending along the whole length of the runner 21.

The other shaft 30 drives a roller 23 in the runner 20 in order to guide the obturator 9 in its movement.

Any other system of driving by cable or belt can be imagined, the motor being fixed and fixed to the chassis under the wing 12.

This principle with sliding with double runner can also be applied to the rear surface in the case where the latter is subjected to a particular kinematics.

The functioning of a device according to the invention will now be described with reference to FIGS. 1, 3, 4.

To open the roof, a control, not shown, is actuated, which moves the two elements 3, 4 towards the trunk 1, after opening the lid 30 of the latter.

The movement of the elements 3, 4 is effected by articulated arms, not shown, but known, which, when the roof is closed, are situated laterally in front of the rear surface 8.

A control, not shown, actuates the cable, which simultaneously drives the pivoting of the arm 13 and that of the arm 17 driving the sideways tilting of the obturators 9 and the tilting of the rear surface 8 towards the trunk 1.

The sideways tilting of the obturators 9 and that of the rear surface 8 releases an opening which allows passage of the arms controlling the elements 3, 4, and that of these elements 3, 4, which can thus tilt into the trunk.

When the roof closes, the elements 3, 4 tilt forwards passing through the opening released by the rear surface 8 and by the lateral obturator 9.

When the roof is completely closed, the rear surface 8 and the obturators 9 return to the closed position.

What is claimed is:

1. A roof that can be retracted into a trunk of a vehicle having a longitudinal axis, said roof comprising a front element, and a rear element having a rear edge, said front and rear elements of the roof being able to move between a position covering a passenger compartment of the vehicle and a folded position in the trunk, the vehicle comprising, between the passenger compartment and the rear edge of the rear element of the roof, a rear surface of the vehicle having lateral edges, said rear surface able to shift in order to uncover an opening to the trunk to allow passage of said front and rear elements into the trunk; a cover beyond each lateral edge of the rear surface of the vehicle, each said cover shifting perpendicular to the longitudinal axis of the vehicle between a first position in which each said cover is situated in alignment with the rear surface of the vehicle and a second position in which each said cover opens a passage to the trunk; and, means for simultaneously controlling the shifting of the rear surface and of each said cover, characterised in that said means are arranged to shift the rear surface of the vehicle towards a front of the trunk of the vehicle and of the covers outwardly from the rear surface of the vehicle.

2. A retractable roof according to claim 1, characterised in that the shifting of each cover comprises tilting controlled by an associated arm mounted on a pivot shaft having an axis parallel to the longitudinal axis of the vehicle, each said arm situated beneath said associated cover when said associated cover is in alignment with the rear surface.

3. A retractable roof according to claim 2, characterised in that the means for controlling the tilting of each arm comprise a cable connected to an end of the arm.

4. A retractable roof according to claim 3, characterised in that the cable further is connected to control the tilting of the rear surface.

5. A retractable roof according to claim 3, including a return spring controlling the tilting of the rear surface and the cover between their first and second positions.

6. A retractable roof according to claim 2, characterised in that the means for controlling the tilting of the arm comprise an electric motor in engagement on the pivot shaft of said arm.

7. A retractable roof according to claim 1, characterised in that the means for controlling the tilting of each cover comprise two guides extending under a laterally positioned rear wing and close to an internal surface thereof, the cover being carried by an arm comprising two rollers engaged respectively in the two guides, said two guides being adapted to guide the movement of the cover between the first and second positions, wherein the cover is situated close to the internal surface of the rear wing of the vehicle when in the second position.

8. A retractable roof according to claim 7, characterised in that the means for controlling the movement of the cover along the guides comprise an electric motor carried on the cover.

* * * * *